United States Patent [19]

Dawson

[11] Patent Number: 4,698,031
[45] Date of Patent: Oct. 6, 1987

[54] CENTER BARRIER FOR WIRE GRIPPING DEVICES

[75] Inventor: Robert H. Dawson, Lake Bluff, Ill.

[73] Assignee: Reliance Electric Company, Cleveland, Ohio

[21] Appl. No.: 895,052

[22] Filed: Aug. 11, 1986

[51] Int. Cl.$^4$ .............................................. H01R 4/50
[52] U.S. Cl. .................................................... 439/863
[58] Field of Search ............ 339/248 S, 255 L, 273 S

[56] References Cited

U.S. PATENT DOCUMENTS

| | | | |
|---|---|---|---|
| 2,463,145 | 3/1949 | Buchanan | 339/248 S |
| 3,172,180 | 3/1965 | Baricevic et al. | 24/126 |
| 3,241,204 | 3/1966 | Baricevic et al. | 339/273 S X |

OTHER PUBLICATIONS

"Section IV—Splicing", Reliable Electric Company, 1972.

Primary Examiner—Eugene F. Desmond
Attorney, Agent, or Firm—Trexler, Bushnell, Giangiorgi & Blackstone, Ltd.

[57] ABSTRACT

A barrier for a wire gripping device of the type wherein a tapered jaw assembly is slideably mounted within a tapered tubular shell defining an axis and having an opening at one axial end thereof, and wherein a pilot cup is disposed in the end opening for surroundingly engaging a terminal end of a cable to be introduced into the gripping device for gripping engagement by the jaw assembly therewithin, and also having a compression spring having one end in engagement with an end surface of the tapered jaw assembly opposite the end opening of the shell. The barrier comprises a unitary-part member disposed in the shell at a location spaced apart from the end opening by an amount at least as great as the combined axial extent of the jaw assembly and compression spring when the latter is fully extended. The barrier member comprises an end abutment portion for abutting an end of the spring opposite its end in engagement with the jaw assembly and for also abutting the pilot cup to define full advancement thereof relative to the shell. The second portion of the barrier comprises a stop portion projecting from the end abutment portion in the direction of the jaw assembly for abutting the same to define a maximum inward amount of travel of the jaw assembly relative to the shell and so as to leave a predetermined minimum axial distance intermediate the jaw assembly and surface and the abutment portion of the barrier. This predetermined minimum axial distance is sufficient to permit passage of the pilot cup completely through the jaw assembly upon insertion and advancement of a cable relative to the gripping device.

8 Claims, 8 Drawing Figures

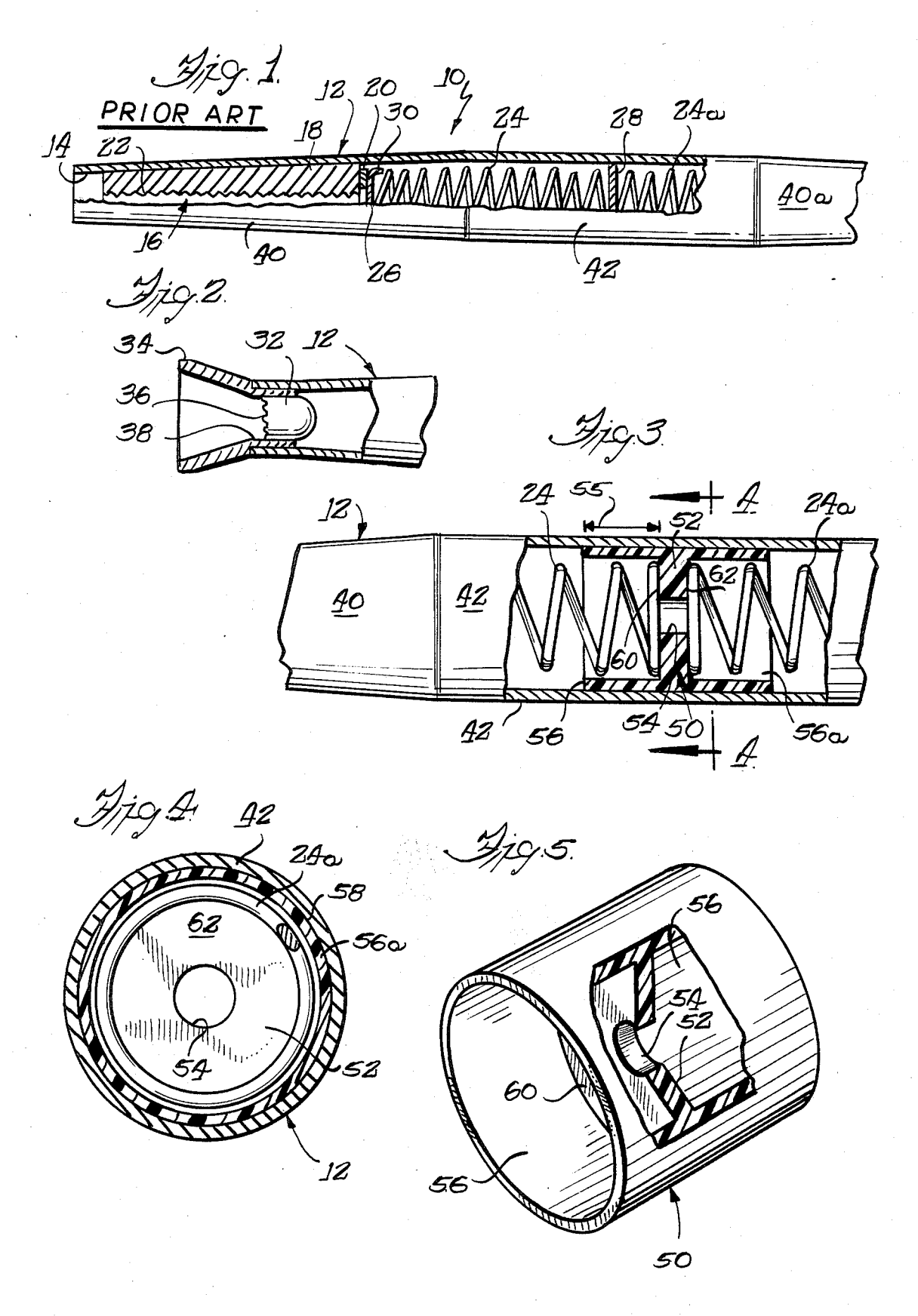

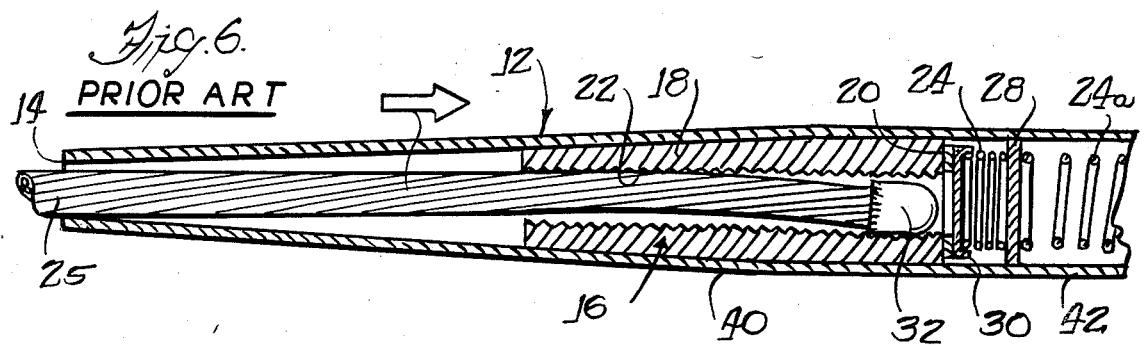
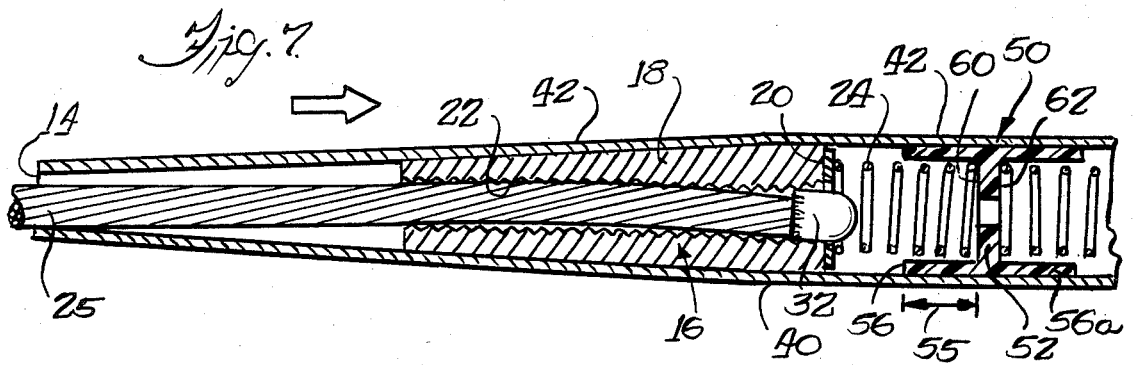
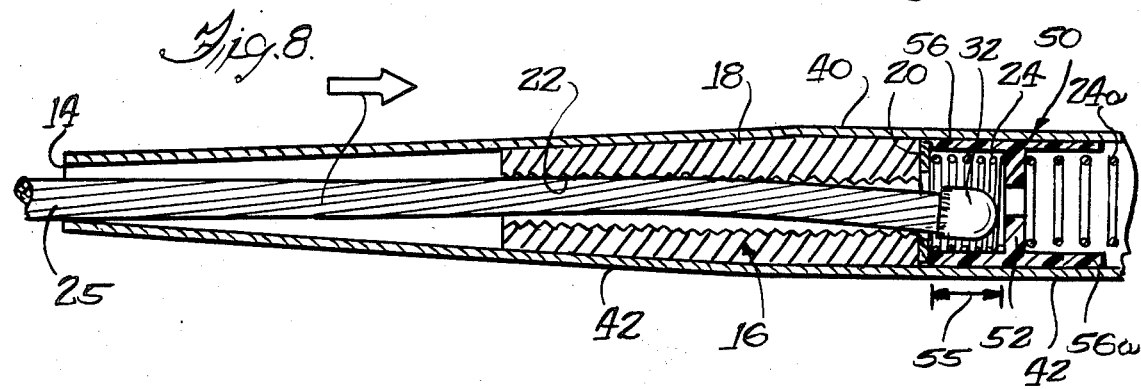

CENTER BARRIER FOR WIRE GRIPPING DEVICES

BACKGROUND OF THE INVENTION

This invention relates generally to wire gripping devices such as line splices and deadends and is particularly applicable to line splices and deadends of the sliding jaw type. More particularly, the invention is directed to a novel and improved end or center barrier for such devices.

Wire gripping devices of both the line splice and deadend type generally use serrated jaws or jawlike assemblies to grip a cable or conductor terminal end portion inserted therein. Such gripping devices generally include a tapered housing or shell within which such jaws or jaw assemblies having complementary tapered exterior surfaces are slidably mounted, so as to generally grip a wire or cable within the shell or housing. One such wire gripping device is shown and described in U.S. Pat. No. 3,172,180 to F. P. Baricevic et al.

A typical wire gripping device has at least one open end of the shell into which the conductor terminal end to be gripped is inserted. Usually, a pilot cup member is provided at the insertion end which encapsulates or surroundingly engages the terminal end of the conductor. The cup and conductor then passes through a serrated gripping jaw assembly, the external surfaces of which are tapered to correspond to an internal taper of the shell or housing. Typically, a spring or other resilient member is provided for normally urging the jaws in the direction of the housing or shell end opening. Accordingly, when the conductor has been inserted through the jaws, the latter tend to return toward the entrance, with the complementary tapers tending to close jaws about the cable. Hence, further outward pulling or tension upon the cable tends to pull the tapered jaws into an even more securely clamping condition about the cable, thus preventing removal thereof.

As mentioned above, such gripping assemblies or arrangements may be utilized either as a deadend or terminating device for a cable under tension, or to splice together ends of a pair of cables under tension. It will be understood, therefore, that the barrier of the invention is applicable to both types. That is, the invention may provide a barrier for either a deadend type gripping device or a center barrier for a bi-ended or wire splicing gripping device.

Typically, the cables to be terminated or gripped by such devices are provided wound up on reels.

Accordingly, as the cables are unreeled they tend to retain a generally curved set, bow or curvature. I have recently determined that this bow or curvature may cause the cable frictionally to engage the jaw assembly and to force or push the jaw assembly inwardly of the shell or housing as the conductor is inserted. Such movement of the jaw assembly may cause a total collapsing or compression of the compression spring by the jaw assembly, thus leaving the jaw assembly relatively closely axially spaced to an end wall or center barrier of the housing. In most such devices, the end wall or barrier defines an inward limit of the movement of the cable and pilot cup relative to the housing. In the case of bi-ended or splice-type gripping devices, the center barrier provides an end wall or stop surface for the cables entering the housing from both ends.

However, if the compression springs are collapsed such that the jaw end surfaces are closely axially spaced from the end or center barrier, the terminal end of the wire with the pilot cup engaged thereabout is precluded from moving fully through and clear of the jaws. Moreover, the installer, upon feeling the bottoming of the jaws within the housing or shell, assumes that the cable has been fully and properly inserted therewithin, clearing the jaws as is normally desired, when in fact the pilot cup has remained between the jaws. With the pilot cup lodged between the jaws, the jaws are prevented from developing the full desired grip on the cable or conductor. Such an incomplete grip can cause the device to fail in operation, releasing the grip on the cable, particularly when the cable is placed under tension, precluding the intended operation of the gripping device.

It is additionally possible that such incomplete insertion of the cable relative to the jaws and housing may occur from operator or installer error or use of improper technique. In any event, it is desirable that the effects of either cable curvature or installer error on the ultimate operation and reliability of the gripping device be substantially reduced. The novel barrier of the present invention facilitates this desirable result.

BRIEF DESCRIPTION OF THE DRAWINGS

The features of the present invention which are believed to be novel are set forth with particularity in the appended claims. The organization and manner of operation of the invention together with further objects and advantages thereof, may best be understood by reference to the following description taken in connection with the accompanying drawings, in the several figures of which like reference numerals identify like elements, and in which:

FIG. 1 is a partial side elevation, partially broken away and partially in section, illustrating a wire gripping device in accordance with the prior art;

FIG. 2 is a somewhat enlarged fragmentary end view, also partially broken away and partially in section, illustrating further a pilot cup and tapered entrance guide associated with a wire gripping device in accordance with both the prior art and the present invention;

FIG. 3 is an enlarged partial side elevation, partially broken away and partially in section, illustrating a wire gripping device provided with a novel barrier in accordance with the invention;

FIG. 4 is an enlarged sectional view taken generally in the plane of the line 4—4 of FIG. 3;

FIG. 5 is a perspective view, partially broken away and partially in section, of a center barrier for a wire gripping device in accordance with the invention;

FIG. 6 is a view similar to FIG. 1, illustrating installation of a cable in the prior art gripping device;

FIG. 7 is a view similar to FIG. 6 illustrating initial installation of a cable in a wire gripping device incorporating a barrier in accordance with the invention; and FIG. 8 is a view similar to FIG. 7 showing full advancement of the cable relative to the wire gripping device in accordance with the invention

DETAILED DESCRIPTION OF THE ILLUSTRATED EMBODIMENT

Referring now to the drawings and initially to FIGS. 1 and 6, a wire gripping device of the type used to provide a splice is designated generally by the reference numeral 10. This device 10 is intended for receiving and gripping terminal end portions of two wires or cables to be spliced or connected together, and for resisting pull out or tension forces acting upon the two wires or cables. The two halves or ends of this wire gripping device 10 are substantially identical and oppositely oriented, whereby only one end or half will be described herein.

The wire gripping device 10 includes a generally tubular, tapered housing or shell 12 which has an open end portion 14, at its smaller diameter end. A tapered jaw assembly 16 is slideably mounted within the housing or shell 12. This tapered jaw assembly 16 has an external tapered surface which generally conforms to the interior tapered surface of shell or housing 14. Preferably, the jaw assembly 16 comprises two or more complementary jaw segments such as segment 18 which are held in assembled condition by a connecting washer 20 at the inner, larger diameter end thereof.

This washer 20 may engage suitable complementary notches or cut-out portions (not shown) provided in the respective jaw bodies or jaws 18, for retaining the same in assembled condition axially, while permitting relative-radial movement thereof within the housing or shell 12. Preferably, these jaws 18 are provided with conductor gripping surfaces which may be in the form of serrated inner surfaces as generally indicated at reference numeral 22.

Hence, when a cable has been inserted through the jaw assembly 16, and is thereafter tensioned or pulled in the direction back outwardly of opening 14, the jaw assembly 16 is moved therewith, generally to the left as viewed in FIG. 1. Thereupon, the taper of the jaws cooperates with the taper of the inner surface of the shell or housing to urge the jaws into gripping engagement with the cable 18. The washer 20 provides means for maintaining the relative axial positions of the jaws 18 without interfering with the axial and radial gripping movement.

Preferably, the jaw assembly 16 is normally urged or biased toward opening 14 and into the conductor gripping position by means of a coil compression spring 24. Spring 24 is confined between a rear or inner end or surface 26 of the jaw assembly 16 and an abutment surface or end or center wall member or barrier 28 of the housing. This center wall or barrier 28 may or may not also abut and stop the end of the cable as well. That is, barrier 28 may comprise a generally annular member, which abuts an end of the spring but permits the cable end to pass therethrough, for example, when the gripping assembly is intended to maintain the position of, and/or tension upon, a cable passing through a wall or the like. However, the barrier also stops axial movement of the cable in a deadend device or in a splice as shown in FIG. 1.

The axially outer end of the spring which abuts the inner end surface of jaw 16 may additionally be provided with a spring cup member 30 thereabout. This cup member 30 generally includes a relatively shallow cup-shaped member arranged to maintain the end of the spring in generally coaxial engagement in the shell 12 and engaging a facing end surface of the jaw assembly 16.

Referring now also to FIG. 2, at the front or entrance end of the shell or housing and located in the opening 14 thereof is a pilot cup 32. The pilot cup is engaged within a generally reversely tapered funnel-like entrance guide member 34 which is pressed or otherwise inserted into the opening 14. More specifically, the pilot cup 32 preferably has slightly flared, serrated, and hence collapsible, marginal portions 36 which engage with an inner edge 38 of the funnel-like tapered entrance guide member or portion 34. This arrangement is such that when an end portion of a cable is inserted into the pilot cup 32 and a moderate degree of pressure is applied, the flared portions will readily be somewhat inwardly deformed and permit movement of the pilot cup axially inwardly of housing 12. The pilot cup thus remains in generally surrounding engagement with the terminal end portion of the cable to be inserted into and gripped by the assembly 10.

As mentioned above, the wire gripping device 10 shown herein is a bi-ended or splice-type device. Accordingly, the housing or shell 12, in addition to the tapered portions 40 extending oppositely outwardly and joined at inner or larger diameter ends thereof, may further comprise an intermediate or central non-tapered or cylindrical shell or housing portion 42. As illustrated in FIGS. 1 and 6, in the prior art device, the center wall or end barrier 28 is a generally flat, and preferably centrally apertured disc-like member. When the cable end with the pilot cup 32 engaged thereabout enters into the device, it should normally pass completely through the jaw assembly 16, and abut the end or center barrier 28.

However, if the conductor is bowed, such as is often the case with conductors wound on reels, the bow may engage the serrated jaws 18 and cause the same to move axially inwardly with the cable as the cable is inserted. If the jaw assembly 16 moves sufficiently far inwardly, it will collapse the spring 24 such that it is relatively closely axially spaced from the center or end barrier 28. This latter condition is illustrated in FIG. 6. When a spring cup 30 is utilized, substantially only the relatively short axial extent of this spring cup 30 will separate the inner end surface 26 of the jaw assembly 16 from the center barrier 28. This bottoming out of the jaw assembly 16 and compression of spring 24 will lead the installer or assembler to believe that the pilot cup has advanced fully through the jaw assembly 16 and contacted the barrier 28, as is normally intended to occur. However, the pilot cup 32 may well remain between the jaws 18, and become lodged in the jaw assembly as shown in FIG. 6. With the pilot cup lodged in the jaw assembly, the jaws are prevented from developing the desired grip on the cable or conductor. This incomplete grip can cause the cable to be released from the jaws when placed under tension, causing failure of the gripping device.

Referring now to FIGS. 3 and 4, an enlarged view of the central portion of the gripping device 10 is shown, wherein a novel center barrier 50 in accordance with the invention has been employed. It will be understood that center barrier 50 may comprise an end barrier for single-ended or deadend type of wire gripping device, as well as a center barrier for the bi-ended or wire splicing type of gripping device illustrated herein.

In accordance with the invention, the barrier 50 is disposed in the shell 12 at a point spaced from the end opening 14 thereof, and preferably at the cylindrical central or intermediate portion 42 in the bi-ended wire spliced gripping device 10 illustrated. However, the barrier 50 may be located at, or mounted to, an end portion of the shell which is generally opposite open end 14 on a single ended or deadend type of gripping device.

The barrier includes an end abutment portion 52 defining a surface for an abutting an end of the spring 24 opposite the end thereof engaging the jaw assembly 16. As best viewed in FIGS. 4 and 5, this abutment portion 52 may comprise a generally annular member or portion having a central through opening 54. In the illustrated embodiment, the through opening 54 is of a diameter less than the diameter of pilot cup 32 for also abutting the pilot cup and defining full advancement thereof, and of a cable end therein, relative to the shell 12.

In accordance with the invention, the novel barrier 50 further includes a stop portion 56 projecting axially outwardly of the end abutment surface portion 52 in the direction of the jaw assembly 16 for defining a maximum inward travel of the jaw assembly relative to the shell. The axial extent of the stop portion 56 is such as to leave a minimum axial distance 55 (see FIGS. 7 and 8) intermediate the jaw assembly end surface 26 and the abutment surface 52 greater than the axial length of the pilot cup 32. This facilitates passage of the pilot cup fully and completely through the jaw assembly upon insertion of the cable, to thereby substantially prevent lodging of the pilot cup between the jaws as sometimes occurred with the prior art design as dicussed hereinabove and as shown in FIG. 6. Reference is invited to FIGS. 7 and 8 wherein following initial insertion of the cable (FIG. 7), the desired full advancement of a cable 25 and pilot cup 32 (see FIG. 8) is facilitated by the novel barrier 50 of the invention, without regard for bowing of the cable and possible snagging of the jaws thereby.

In the preferred embodiment illustrated, the abutment surface portion 52, as mentioned above, is generally annular, having a circular periphery 58 for close engagement with the inner surface of the shell 12, and preferably of cylindrical central or intermediate portion 42 thereof in the illustrated splicing device. The stop portion 56 preferably comprises a generally cylindrical skirt extending from the periphery 58 of the abutment surface 52 in the direction of the jaw end surface 26. Moreover, the skirt 56 is disposed radially outwardly of the compression spring 24 so as to allow free expansion and contraction thereof. However, the axial dimension of the skirt 56 is greater than the axial dimension of the pilot cup, as mentioned above, to facilitate full advancement of the pilot cup through the jaw assembly 16.

In the illustrated embodiment, as previously mentioned, the wire gripping device 10 is a bi-ended splicing device, having substantially identical but oppositely oriented tapered shell halves 40, 40a separated by generally cylindrical intermediate or center portion 42. Accordingly, these shell halves have oppositely facing openings 14 (not shown in FIG. 3) and also oppositely two oriented jaw assemblies similar to jaw assembly 16 described above (also not shown in FIG. 3). Similarly, a pair of similar compression springs 24, 24a are provided, one for each of the jaw assemblies of the two housing or shell halves of the wire gripping device. That is, the wire gripping device illustrated herein comprises a splicing device for effectively coupling together the terminal ends of a pair of wires or cables.

Accordingly, the illustrated barrier 50 comprises a center barrier which is disposed in the area adjoining of the oppositely oriented shell halves and preferably substantially centrally in the cylindrical intermediate or center portion 42. The center barrier 50 thus comprises a single center abutment member 52 which forms respective of oppositely facing abutment surfaces 60, 62 for the respective springs 24, 24a. Abutment member or portion 52 is a substantially disc-like or cylindrical member having generally opposite flat and parallel faces defining these abutment surfaces 60 and 62. The stop portion 56 of this center barrier 50 thus comprises a pair of similar and oppositely projecting stop members or portions 56, 56a which extend from the oppositely facing surfaces 60, 62 of the abutment member 52. As previously mentioned, the abutment member or portion 52 preferably comprises a generally annular body having a circular periphery, such that each of the stop portions 56 and 56a are similar, generally cylindrical skirts extending or projecting oppositely outwardly from the periphery of the center barrier. Moreover, these skirts are disposed radially outwardly of the respective associated springs 24, 24a to avoid any interference with the spring action thereof. The axial outward extent 55 (see FIGS. 7 and 8) of the respective skirts 56 and 56a is generally greater than the axial dimension of an associated pilot cup such as pilot cup 32.

In accordance with the preferred form of the invention illustrated, the entire center barrier 50 is comprised of a one-piece, integrally formed member, preferably formed of a moldable plastics material.

Stated another way, the center barrier in accordance with the invention, as best viewed in FIG. 5, comprises a generally right cylindrical open-ended member having a barrier portion 52 of generally circular configuration substantially centrally axially disposed therein. Accordingly, opposite, generally flat, parallel faces 60, 62 of the generally circular or disc-like barrier 52 abut the respective springs 24 and 24a and also abut the pilot cups 32 from either end to define full advancement thereof. Moreover, portions of the cylindrical wall of the center barrier 50, here designated 56 and 56a, extend oppositely axially outwardly of the center abutment portion 52 to equal extents. These lateral cylindrical wall portions form skirts 56 and 56a which surround the respective springs 24, 24a and provide abutment surfaces for defining full inward advancement of the respective jaw assemblies. Accordingly, the axial extent of the respective cylindrical projecting walls or skirts 56 and 56a is greater than the effective axial length of the pilot cup 32 to assure the pilot cup has room to fully clear or pass through the jaw assembly as it is advanced into the shell 12, as indicated by reference numeral 55 in FIGS. 7 and 8. In this regard, it will be seen that in the prior art assembly as illustrated in FIG. 6, insufficient axial space is left for such full advancement of the cup through the jaws 18 when the latter are axially inwardly driven toward the center barrier 28 compressing the spring 24. This may occur in the prior art assembly due to a bowed cable which snags the serrated jaws.

It will also be noted that the spring cup 30 has been eliminated in the preferred embodiment. However, the spring cup 30 may be retained if desired, and may be arranged to abut the outer periphery of the abutment member or skirt portion 56, so as to assure the maintenance of the desired minimum axial distance 55 described above to accommodate cup 32.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A wire gripping device of the type wherein a tapered jaw assembly is slidably mounted within an elongate, tapered, tubular shell defining an axis and having an opening at one axial end thereof, wherein a pilot cup is disposed in said end opening for surroundingly engaging a terminal end of a cable to be introduced into the gripping device to be grippingly engaged by said jaw assembly therewithin, and further having a compression spring having one end thereof in engagement with an end surface of the tapered jaw assembly at an end thereof opposite said shell end opening; and a fixed barrier member disposed in said shell at a position axially spaced from said end opening thereof by a predetermined amount at least as great as the combined axial length of the jaw assembly and the compression spring when the latter is in a fully extended condition; said barrier member comprising an end abutment surface portion for abutting an end of said spring opposite its engagement with said jaw assembly and for abutting said pilot cup and thereby defining full advancement thereof relative to said shell, and a stop portion projecting from said end abutment portion in the direction of said jaw assembly for providing a stop surface for said jaw assembly and for defining a maximum inward travel thereof relative to said shell; the axial extent of said stop portion being sufficient to leave a predetermined minimum axial distance intermediate the jaw assembly end surface and the abutment surface portion greater than the axial length of the pilot cup to thereby facilitate passage of the pilot cup completely through the jaw assembly upon insertion and advancement of a cable into the gripping device.

2. A device according to claim 1 wherein said abutment surface portion comprises a generally annular body having a through opening of a diameter less than a diameter of said pilot cup for defining said full advancement of said pilot cup and a cable end therein relative to the shell.

3. A device according to claim 1 wherein said abutment surface portion has a generally circular periphery for close engagement with an inner surface of said shell; and wherein said stop portion comprises a generally cylindrical skirt extending from the periphery of said abutment surface portion in the direction of the jaw end surface, and radially outwardly of said compression spring, and having an axial extent greater than the axial dimension of said pilot cup.

4. A device according to claim 1 wherein said barrier comprises a one-piece, integrally formed member.

5. A device according to claim 1 wherein said wire gripping device is bi-ended having a pair of joined, substantially identical but oppositely oriented shell halves having oppositely facing end openings for receiving terminal end parts of a pair of oppositely directed cables therewithin, and also oppositely oriented jaw assemblies and a pair of said compression springs, and wherein said barrier is a center barrier disposed at the area of joining of the oppositely oriented shell halves and having a single abutment member forming an end abutment surface for both of said compression springs and pilot cups; said stop portion comprising a pair of substantially identical and oppositely projecting stop members extending from oppositely facing surfaces of said abutment member.

6. A device according to claim 5 wherein said center barrier comprises a generally annular body having a through opening of diameter less than the diameter of said pilot cup.

7. A device according to claim 5 wherein each of said stop portions comprises a similar, generally cylindrical skirt extending axially from a periphery of the center barrier outwardly of the associated spring, and each having an axial extent greater than the axial dimension of the associated pilot cup.

8. A device according to claim 5 wherein said center barrier is a one piece, integrally formed member.

* * * * *